с010171726B2

United States Patent
Tokairin

(10) Patent No.: US 10,171,726 B2
(45) Date of Patent: Jan. 1, 2019

(54) IMAGE SHOOTING APPARATUS FOR SETTING IMAGE SHOOTING CONDITION EASILY AND METHOD THEREOF

(71) Applicant: CASIO COMPUTER CO., LTD., Shibuya-ku, Tokyo (JP)

(72) Inventor: Yuko Tokairin, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 12 days.

(21) Appl. No.: 14/957,737

(22) Filed: Dec. 3, 2015

(65) Prior Publication Data
US 2016/0191791 A1 Jun. 30, 2016

(30) Foreign Application Priority Data
Dec. 24, 2014 (JP) .................................. 2014-260699

(51) Int. Cl.
*H04N 1/00* (2006.01)
*H04N 5/232* (2006.01)
(Continued)

(52) U.S. Cl.
CPC ....... *H04N 5/23216* (2013.01); *G06F 3/0488* (2013.01); *G06F 3/04847* (2013.01);
(Continued)

(58) Field of Classification Search
CPC ............. H04N 5/23216; H04N 1/0035; H04N 5/23222; H04N 5/23293; G06F 3/0488; G06F 3/04847
See application file for complete search history.

(56) References Cited

U.S. PATENT DOCUMENTS 6,888,532 B2 * 5/2005 Wong .................... G06F 1/1626
345/156
2010/0033587 A1 * 2/2010 Yumiki ............... H04N 5/23209
348/220.1
(Continued)

FOREIGN PATENT DOCUMENTS

JP 1999-212726 8/1999
JP 11212726 A * 8/1999
(Continued)

OTHER PUBLICATIONS

JP-11212726-A Machine Translation (Year: 1999).*
(Continued)

*Primary Examiner* — Jason A Flohre
(74) *Attorney, Agent, or Firm* — Amin, Turocy & Watson LLP

(57) ABSTRACT

A shooting apparatus includes a touch panel on a display and performs self-timer shooting. The shooting apparatus includes a CPU configured to detect a dragging manipulation status from a touch start point on a fixed or an arbitrary point on the touch panel to an end of the touch, update one condition selected out of a self-timer time and a continuous shooting number as a first shooting condition, perform a control of updating and displaying the updated first shooting condition on at least one position selected out of a point on the display corresponding to the touch start point, the fixed point on the display, and a point on the display along with the dragging manipulation status whenever the first shooting condition is updated, and set the updated first shooting condition as a shooting condition for performing a shooting.

23 Claims, 12 Drawing Sheets

(51) Int. Cl.
*G06F 3/0484* (2013.01)
*G06F 3/0488* (2013.01)

(52) U.S. Cl.
CPC ....... *H04N 1/0035* (2013.01); *H04N 5/23222* (2013.01); *H04N 5/23293* (2013.01)

(56) References Cited

U.S. PATENT DOCUMENTS

| | | | | |
|---|---|---|---|---|
| 2012/0011456 | A1* | 1/2012 | Noda | H04N 5/23216 715/769 |
| 2013/0063645 | A1* | 3/2013 | Aoyama | H04N 5/23293 348/333.01 |
| 2013/0083222 | A1* | 4/2013 | Matsuzawa | H04N 5/23212 348/240.3 |
| 2013/0194215 | A1* | 8/2013 | Toida | G06F 3/041 345/173 |
| 2013/0257762 | A1* | 10/2013 | Masuda | G06F 3/017 345/173 |
| 2013/0278808 | A1* | 10/2013 | Tokairin | G06F 3/041 348/333.01 |
| 2014/0016921 | A1* | 1/2014 | Choi | H04N 5/23216 396/264 |
| 2014/0223376 | A1* | 8/2014 | Tarvainen | H04N 5/23216 715/833 |

FOREIGN PATENT DOCUMENTS

| | | |
|---|---|---|
| JP | 2004-064205 | 2/2004 |
| JP | 2005-086508 | 3/2005 |
| JP | 2008-090753 | 4/2008 |
| JP | 2010-183477 | 8/2010 |
| JP | 2010-226319 | 10/2010 |
| JP | 2012-018535 | 1/2012 |
| JP | 2012-147167 | 8/2012 |
| JP | 2013-058958 | 3/2013 |
| JP | 2013-070303 | 4/2013 |

OTHER PUBLICATIONS

Japanese Office Action for Japanese Patent Application No. 2014-260699 dated May 10, 2016.
Japanese Office Action for Japanese Patent Application No. 2016-187757 dated Aug. 8, 2017.

* cited by examiner

FIG. 7
(a)
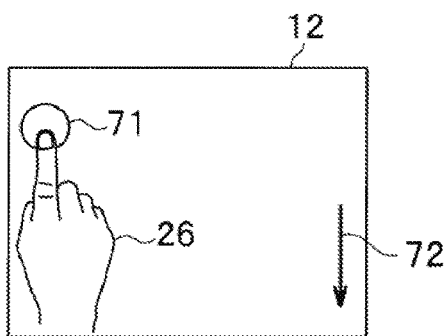
(b)
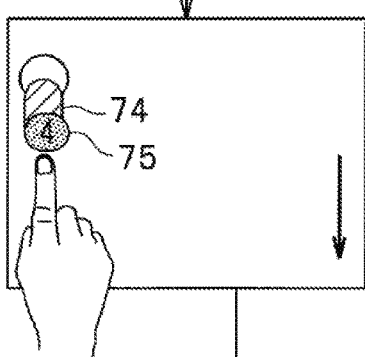
(c)
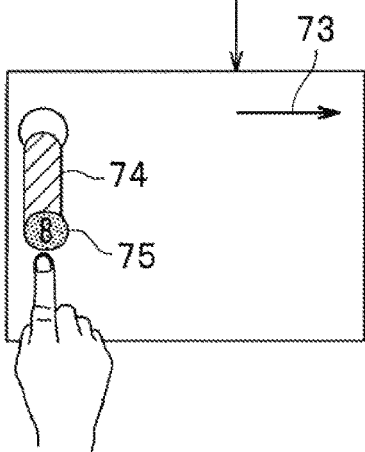
(d)
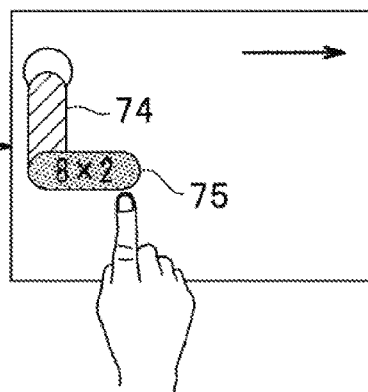

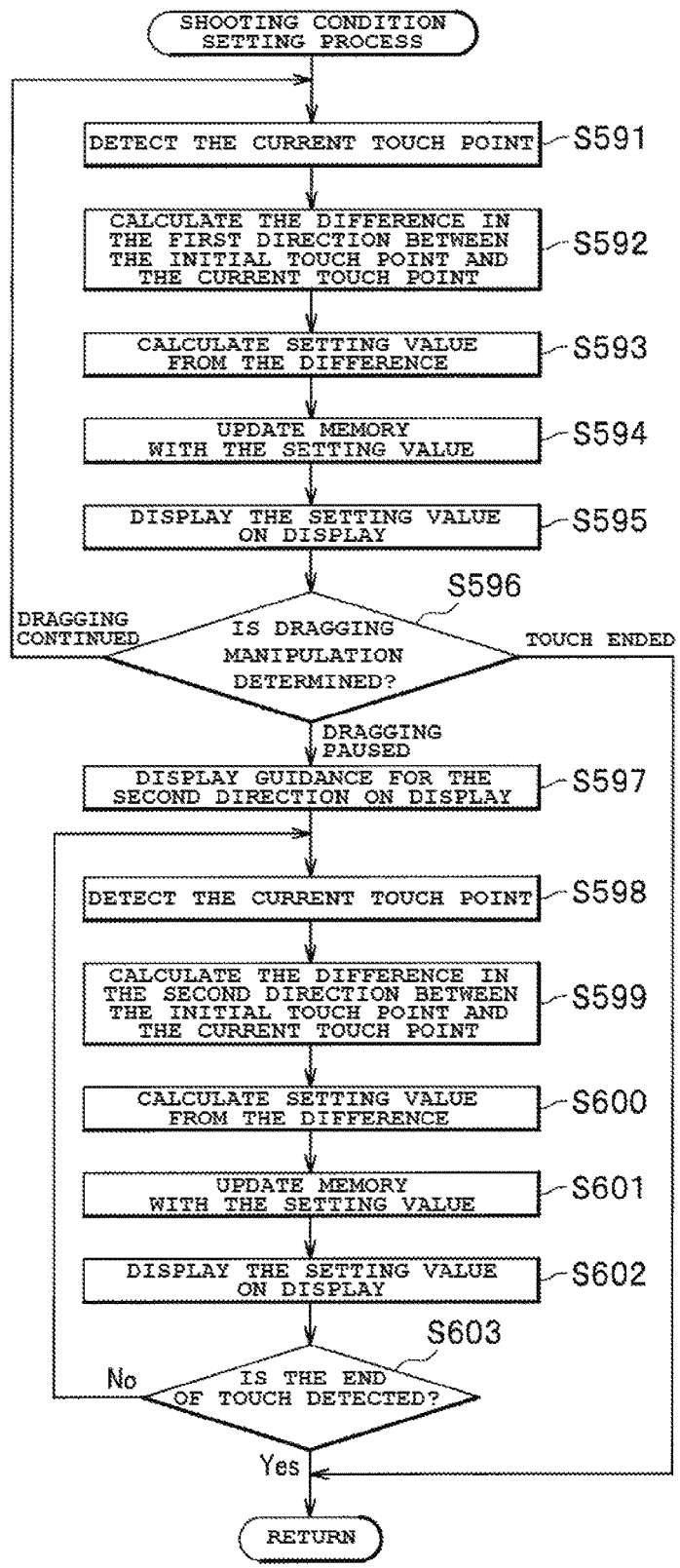

IMAGE SHOOTING APPARATUS FOR SETTING IMAGE SHOOTING CONDITION EASILY AND METHOD THEREOF

CROSS-REFERENCE TO RELATED APPLICATIONS

This application is based upon and claims the benefit of priority under 35 USC 119 of Japanese Patent Application No. 2014-260699 filed on Dec. 24, 2014, the entire disclosure of which is incorporated herein by reference in its entirety for all purposes.

BACKGROUND OF THE INVENTION

1. Field of the Invention

The present invention relates to an image shooting apparatus including a monitor and a method for setting image shooting condition.

2. Description of the Related Art

Conventionally, an image shooting apparatus such as camera includes a self-timer function for executing a delayed shooting in a predetermined time after a shutter is pressed, which is widely used for taking pictures of a group of people including the shooter. Conventionally, the delayed time for executing the actual shooting after the shutter is pressed is fixed to a predetermined time, for example, 10 seconds. In order to increase the usability of the self-timer function, for example, Japanese Patent Application Laid-Open Publication No. 2005-865508 discloses a technology which may change the delayed time for executing the actual shooting according to the shooting environment.

SUMMARY OF THE INVENTION

According to one embodiment of the present invention, a shooting apparatus, which includes a touch panel on a display, capable of self-timer shooting is provided. The shooting apparatus includes a CPU that is configured to perform a manipulation status detection to detect a dragging manipulation status from a touch start point on a fixed or an arbitrary point on the touch panel to an end of the touch, perform a shooting condition update to update one condition selected out of a self-timer time and a continuous shooting number as a first shooting condition according to the dragging manipulation status detected by the manipulation status detection, perform a display control to perform a control of updating and displaying the first shooting condition updated by the shooting condition update on at least one position selected out of a point on the display corresponding to the touch start point, the fixed point on the display, and a point on the display along with the dragging manipulation status whenever the first shooting condition is updated, and perform a shooting condition setting to set the updated first shooting condition as a shooting condition for performing a shooting.

According to one embodiment of the present invention, a shooting apparatus, which includes a touch panel in a display, is provided. The shooting apparatus includes a CPU that is configured to perform a position detection to detect a touch start point on the touch panel, perform a manipulation status detection to detect a dragging manipulation status in a first direction which continues from the touch start point on the touch panel, perform a detection direction control to perform a control of changing the first direction detected in the manipulation status detection according to the touch start point detected in the position detection, perform a display control to perform a control of displaying a guidance which guides the first direction changed in the detection direction control, and perform a shooting condition setting to set a first shooting condition according to the dragging manipulation status in the first direction detected in the manipulation status detection.

According to one embodiment of the present invention, a shooting apparatus, which includes a touch panel in a display, capable of self-timer shooting is provided. The shooting apparatus includes a CPU that is configured to perform a position detection to detect a touch point on the touch panel, perform a manipulation status detection to detect a dragging manipulation status in a first direction which continues from a touch start point on the touch panel and a dragging manipulation status in a second direction which is different from the first direction, and perform a shooting condition setting to set a first shooting condition related to the self-timer shooting according to the dragging manipulation status in the first direction detected in the manipulation status detection, and a second shooting condition related to the self-timer shooting according to the dragging manipulation status in the second direction detected in the manipulation status detection.

According to one embodiment of the present invention, a method for setting a setting condition for a shooting apparatus, which includes a touch panel in a display, capable of self-timer shooting is provided. The method includes detecting a dragging manipulation status from a touch start point on a fixed or an arbitrary point on the touch panel to an end of the touch, updating one condition selected out of a self-timer time and a continuous shooting number as a first shooting condition according to the detected dragging manipulation status, performing a control of updating and displaying the updated first shooting condition on at least one position selected out of the fixed point on the display, a point on the display corresponding to the touch start point and a point on the display along with the dragging manipulation status whenever the first shooting condition is updated, and setting the updated first shooting condition as a shooting condition for performing a shooting.

According to one embodiment of the present invention, a method for shooting by a shooting apparatus, which includes a touch panel in a display, is provided. The method includes detecting a touch start point on the touch panel, detecting a dragging manipulation status in a first direction which continues from the touch start point on the touch panel, performing a control of changing the first direction according to the detected touch start point, performing a control of displaying a guidance which guides the changed first direction, and setting a first shooting condition according to the dragging manipulation status in the detected first direction.

According to one embodiment of the present invention, a method for setting a shooting condition for a shooting apparatus, which includes a touch panel in a display, capable of self-timer shooting is provided. The method includes detecting a touch point on the touch panel, detecting a dragging manipulation status in a first direction which continues from a touch start point on the touch panel and a dragging manipulation status in a second direction which is different from the first direction, and setting a first shooting condition related to the self-timer shooting according to the dragging manipulation status detected in the first direction, and a second shooting condition related to the self-timer shooting according to the dragging manipulation status detected in the second direction.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are, however, exclusively for explanation and do not limit the scope of the present invention.

Here:

FIG. 7 is a schematic diagram showing how to set a time for self-timer and a shooting number for continuous shooting according to the second embodiment of the present invention.

FIG. 12 is a detailed flow chart for explaining a shooting condition setting process according to the second embodiment of the present invention.

DETAILED DESCRIPTION OF THE PREFERRED EMBODIMENT

Hereinafter, embodiments of the present invention will be described with reference to the accompanying drawings.

Figure 1:
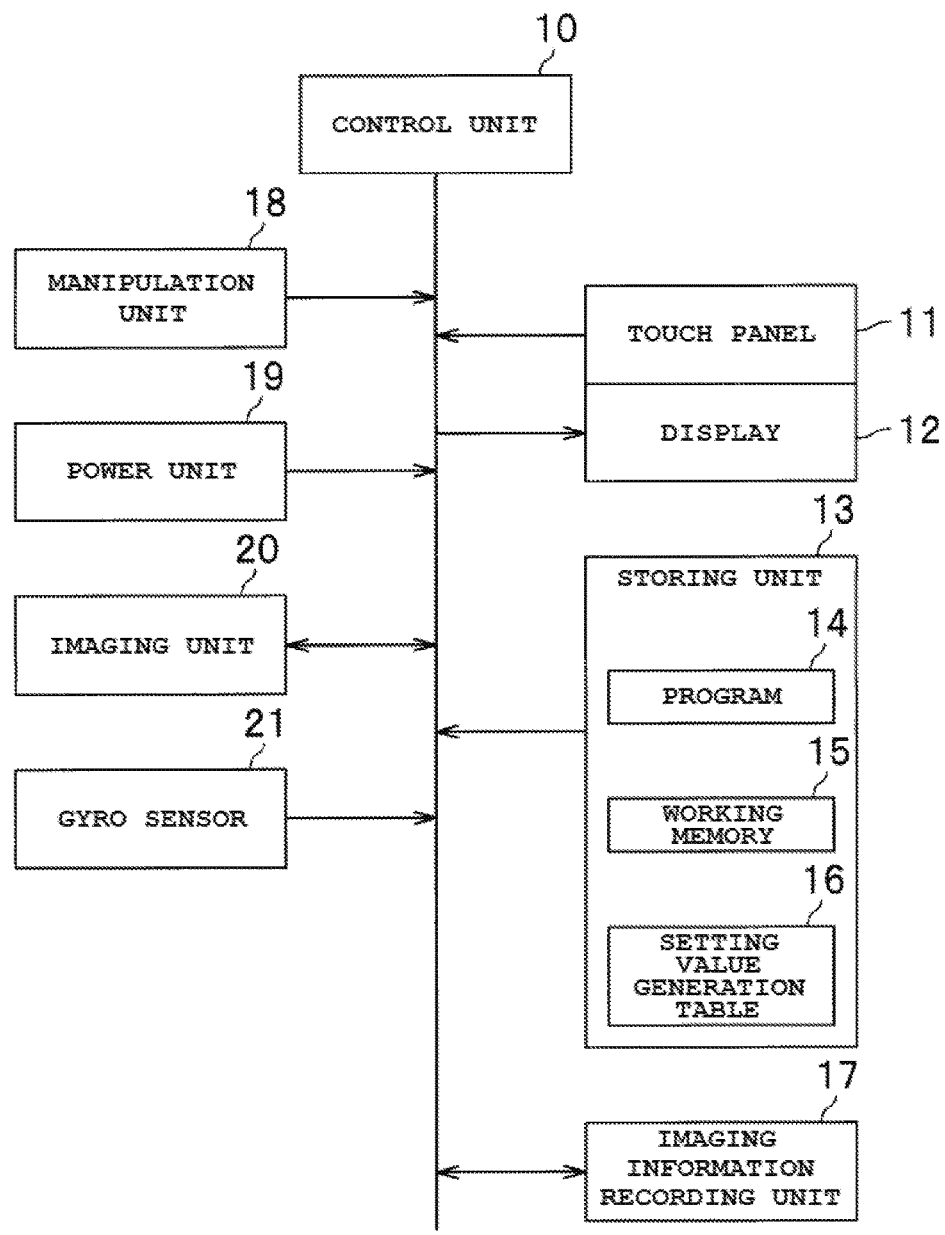
FIG. 1 shows a configuration of a shooting apparatus according to the first or the second embodiment of the present invention.

A shooting apparatus according to the first or the second embodiment of the present invention may be, for example, a digital camera capable of taking a moving picture as well as taking a still image photograph and executing self-timer shooting, of which the configuration will be explained in detail with reference to FIG. 1.

A control unit 10 includes a central processing unit (CPU) (not shown) which executes and controls functionalities of the shooting apparatus including a shooting function for storing an image taken by an imaging unit 20 according to imaging instructions from a manipulation unit 18 in an imaging information recording unit 17, or a preview function for displaying an image in the imaging information recording unit 17 on a display.

A storing unit 13 includes a ROM (Read Only Memory) and/or a RAM (Random Access Memory). The storing unit 13 is configured to include a program 14 executed by the control unit 10, a working memory 15 for storing variables and/or flags necessary for operations of the control unit 10 and temporary images taken, and a setting value generation table 16 for generating a shooting condition or a manipulation amount.

The imaging information recording unit 17 may be a portable memory (a recording medium) such as an SD card, and stores images taken.

The imaging unit 20 includes an optical lens capable of zooming and/or auto-focusing (AF), and a digital imaging device such as CCD (Charge Coupled Device) or CMOS (Complementary Metal Oxide Semiconductor) image sensor. Movement and/or focusing of the optical lens is controlled by the control unit 10. An image taken by the imaging unit 20 goes through the image processing by the control unit 10 and is recorded as a shot image in the imaging information recording unit 17.

A display 12 may be a liquid crystal display (LCD) and displays images and/or texts on it. The display 12 is used for a monitor display which displays a live view image taken by the imaging unit 20 and/or a preview display which displays a preview image of an image recorded in the imaging information recording unit 17. The display 12 further displays a shooting condition setting screen, which is described in detail, later.

A touch panel 11 is disposed on the display 12 so that a user provides a touch input according to a setting or manipulation screen displayed on the display 12.

The touch panel 11 detects a coordinate of a touch point of, for example, a user's finger by capacitive, resistive or electro-magnetic induction mechanism.

The control unit 10 can detect the type of touch manipulation including a touch input such as tapping or double tapping, a long tapping which means a touch input of relatively long time, a dragging which means a sliding input while maintaining the finger in touch with the touch panel 11, etc. by detecting touch coordinates consecutively or continuously. If the touch panel 11 allows multi-point touch input, it is also possible to detect manipulations such as pinch-in or pinch-out which means the user manipulation of narrowing or widening the fingers in touch with the touch panel 11.

According to the first or the second embodiment of the present invention, the shooting apparatus may include a mechanical manipulation unit 18 such as a power switch, a shutter button, a zoom lever, a menu selection key, or the like (all not shown) as well as the touch panel 11. The shutter button, the zoom lever or the menu selection key may be substituted by the touch panel 11 for the respective functionalities.

Further, the shooting apparatus according to the first or the second embodiment of the present invention may detect its own installation orientation by including a gyro sensor 21. Thus, the control unit 10 can determine an absolute direction of a dragging of the touch panel 11. Further, the shooting apparatus according to the first or the second embodiment of the present invention may include a geomagnetic sensor or an accelerometer sensor for detecting its own installation orientation instead of the gyro sensor 21.

A power unit 19 supplies electric power to each unit of the shooting apparatus.

Next, in order to clearly explain that the shooting condition including self-timer time can be easily set according to the present invention, hereinafter described are the first embodiment where a self timer time and a continuous shooting number is set by an arbitrary combination of downward and rightward draggings on the touch panel 11, and the second embodiment where a self timer time and a continuous shooting number is set by a sequential combination of downward and rightward draggings.

The First Embodiment

The shooting apparatus according to the first embodiment of the present invention executes self-timer shooting after a predetermined time corresponding to a self-timer time if the self-timer time is set by a user, and executes continuous shooting of a predetermined number of photos corresponding to a continuous shooting number if the continuous shooting number is set by a user. Further, the shooting apparatus according to the first embodiment executes continuous shooting of the number set by a user after a predetermined time when it executes the self-timer shooting if both of the self-timer time and the continuous shooting number are set by the user.

Figure 2:
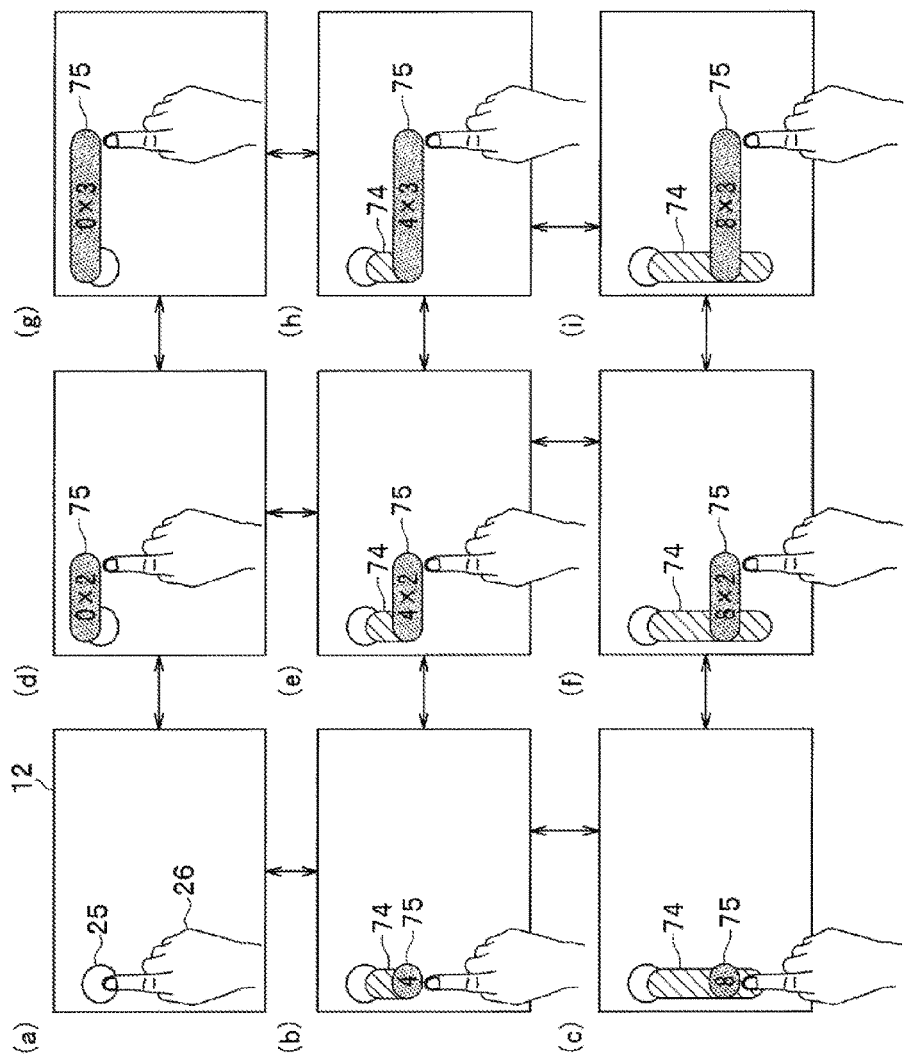
FIG. 2 is a schematic diagram showing how to set a time for self-timer and a shooting number for continuous shooting according to the first embodiment of the present invention.
Figure 3:
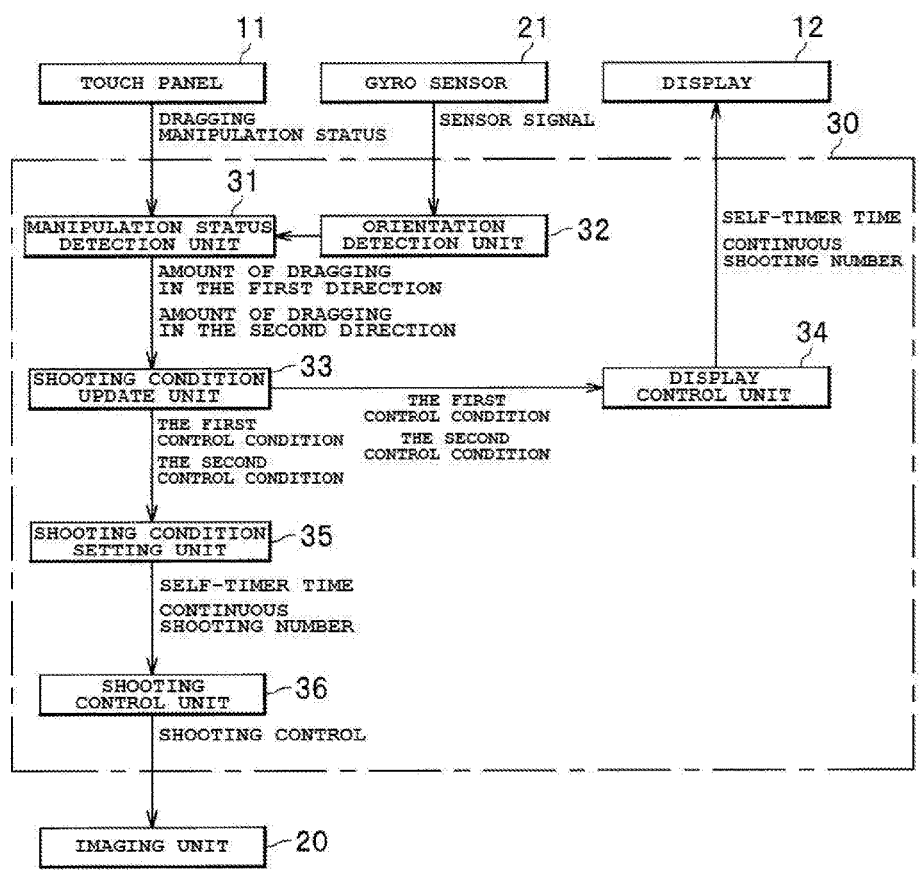
FIG. 3 is a functional block diagram according to the first embodiment of the present invention.
Figure 4:
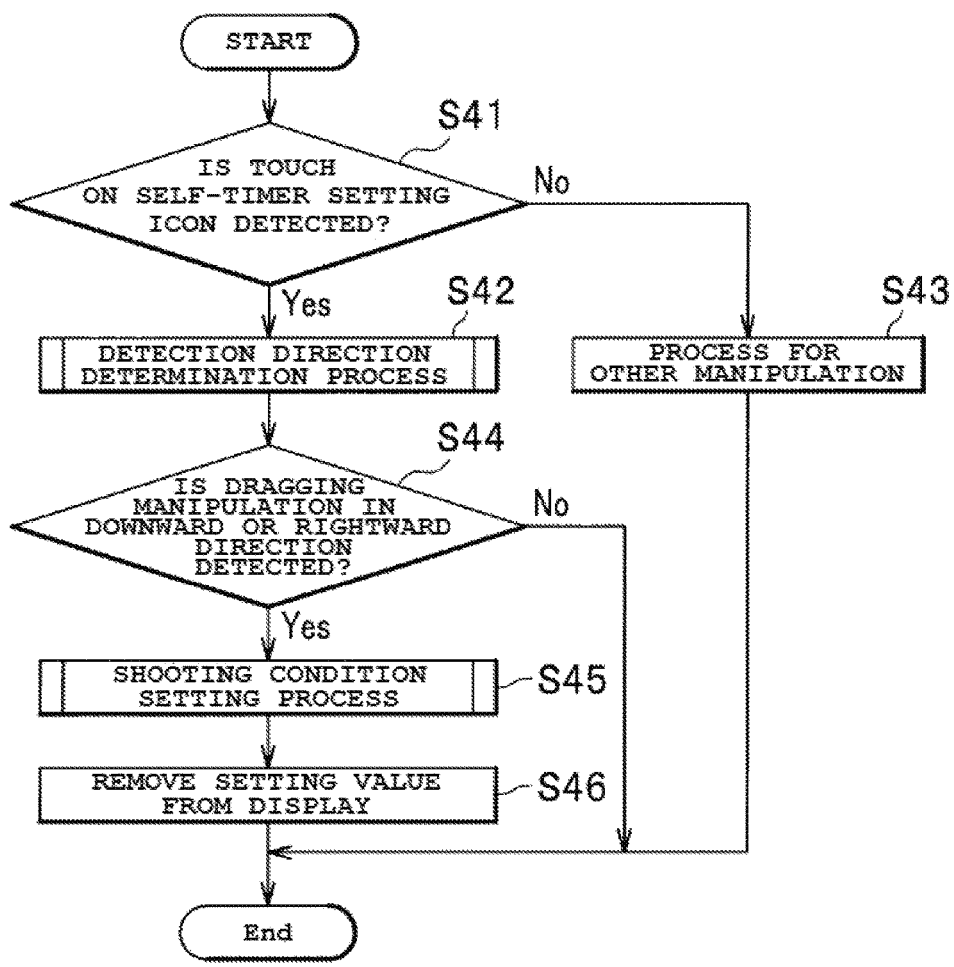
FIG. 4 is a flow chart for explaining a setting process according to the first embodiment of the present invention.
Figure 5:
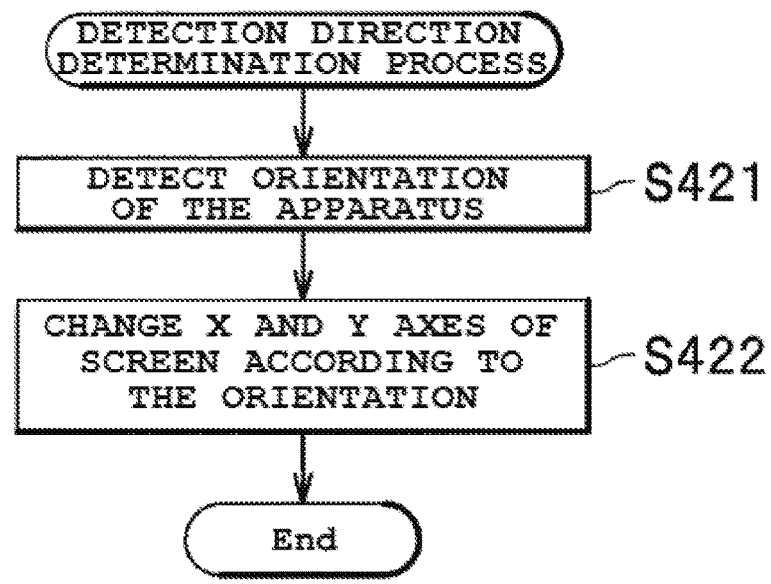
FIG. 5 is a detailed flow chart for explaining a detection direction determination process according to the first embodiment of the present invention.
Figure 6:
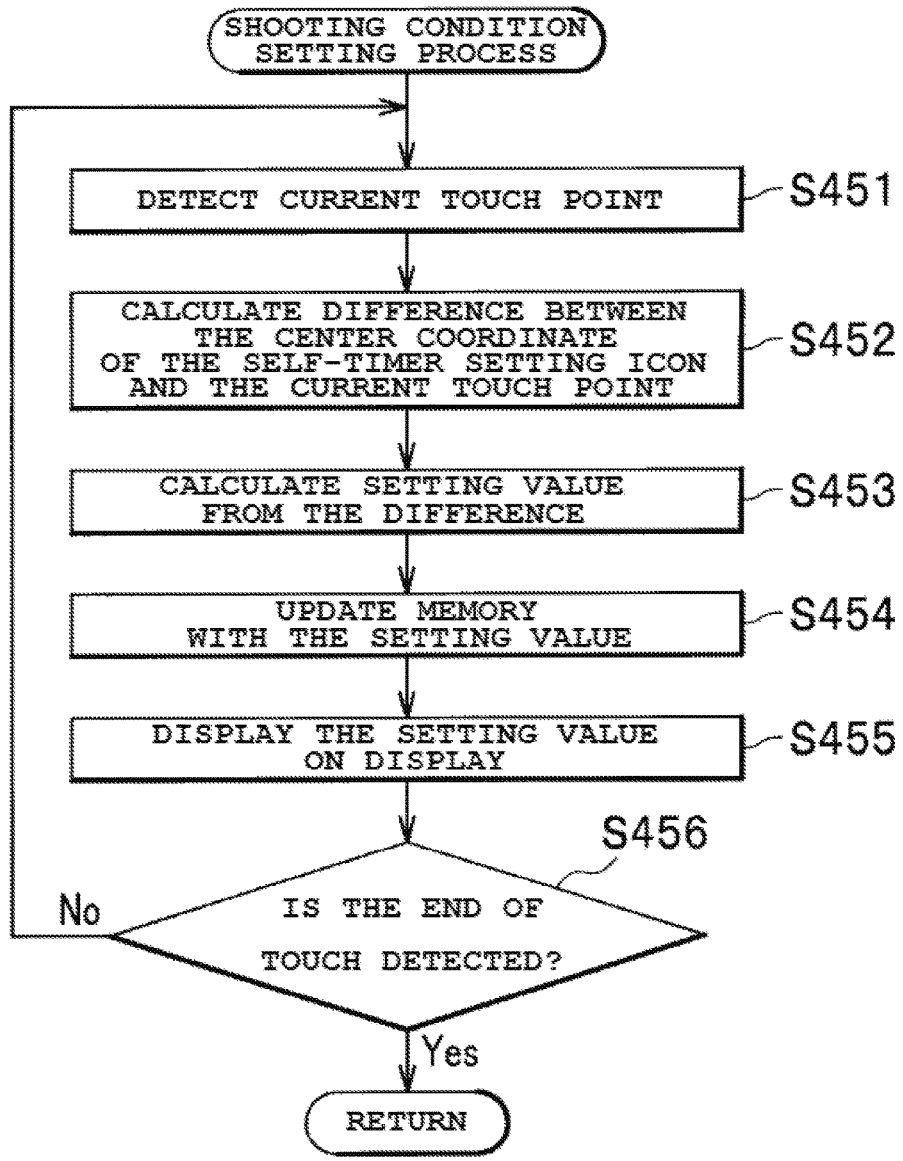
FIG. 6 is a detailed flow chart for explaining a shooting condition setting process according to the first embodiment of the present invention.

An embodiment, where a self-timer time or a continuous shooting number is set by a downward or rightward dragging in random order, is described with reference to FIGS. 2 to 6. FIG. 2 is a schematic diagram showing an embodiment for setting a self-timer time and a continuous shooting number, FIG. 3 is a functional block diagram, and FIGS. 4-6 are flow charts for explaining process flows according to the present embodiment.

FIG. 2 is a schematic diagram explaining the present embodiment where a self-timer time and a continuous shooting number are set by dragging a user's finger 26 in two directions in touch with the display 12 (and the touch panel 11). Although now shown in the drawing, a live view image being taken by the imaging unit 20 is being displayed on the display 12.

As shown in FIG. 2(*a*), as the user touches a self-timer setting icon 25 with her finger 26, a process for setting the self-timer time and the continuous shooting number starts.

As the user drags the finger 26 downwards, the screen of the display 12 changes from one shown in FIG. 2(*a*) to one shown in FIG. 2(*c*) via one shown in FIG. 2(*b*).

As shown in FIG. 2(*b*), a drag mark 74 indicating a downward dragging is being performed and a circular drag mark 75 indicating no rightward dragging is being performed are displayed on the display 12. The drag mark 74 is shown to have a length corresponding to the downward component of the distance from the setting icon 25 (i.e. the initial touch point) to the present touch point. The self-timer time (for example, "4"), whose value is set according to the amount of the dragging, is being updated and shown on the drag mark 75.

The value (for example, "8") of the self-timer time, which is set according to the amount of the dragging, is updated and displayed on the drag mark 75, as shown in FIG. 2(*c*). When the user's finger 26 is off from the display 12, the self-timer time is set to, for example 8 seconds, and the continuous shooting number remains as a default value, for example 1. Hereinafter, the setting value of the self-timer time is the value at the time when the user's finger is off from the display 12 (i.e. when the dragging is ended).

As the user drags the finger 26 rightwards, the screen of the display 12 changes from one shown in FIG. 2(*a*) to one shown in FIG. 2(*g*) via one shown in FIG. 2(*d*).

A drag mark 75 indicating a rightward dragging is being performed, and a combination of setting values "0×2" of the self-timer time and the continuous shooting number, which are set according to the amounts of the draggings, are updated and displayed on the display 12, as shown in FIG. 2(*d*). The drag mark 75 is shown to have a length corresponding to the rightward component of the distance from the setting icon 25 (i.e. the initial touch point) to the present touch point.

A combination of values (for example, "0×3") of the self-timer time and the continuous shooting number, which are set according to the amounts of the draggings, is updated and displayed, as shown in FIG. 2(*g*). When the user's finger 26 is off from the display 12, the self-timer time is set to zero, and the continuous shooting number to 3.

As the user drags the finger 26 rightwards, the screen of the display 12 changes from one shown in FIG. 2(*c*) to one shown in FIG. 2(*i*) via one shown in FIG. 2(*f*). This corresponds to a case where the dragging is in combination of downward and rightward directions.

A drag mark 74 indicating a downward dragging is being performed and a drag mark 75 indicating a rightward dragging is being performed are displayed as shown in FIG. 2(*f*). Further, a combination of the values (for example, "8×2") of the self-timer time and the continuous shooting number, which are set according to the amounts of the draggings, is updated and displayed.

A combination of the values (for example, "8×3") of the self-timer time and the continuous shooting number, which are set according to the amounts of the draggings, are updated and displayed as shown in FIG. 2(*i*). When the user's finger 26 is off from the display 12, the self-timer time is set to 8 seconds, and the continuous shooting number to 3.

Similarly, as the user drags the finger 26 rightwards, the screen of the display 12 changes from one shown in FIG. 2(*b*) to one shown in FIG. 2(*h*) via one shown in FIG. 2(*e*).

As the user drags the finger 26 downwards, the screen of the display 12 changes from one shown in FIG. 2(*d*) to one shown in FIG. 2(*f*) via one shown in FIG. 2(*e*).

As the user drags the finger 26 downwards, the screen of the display 12 changes from one shown in FIG. 2(*g*) to one shown in FIG. 2(*i*) via one shown in FIG. 2(*h*). As above, when the user's dragging is in combination of downward and rightward directions, the self-timer time and the continuous shooting number, which are set according to the amounts of the draggings, are updated and displayed on the display 12.

In any situation shown in any one of FIGS. 2(*a*)-(*i*), the self-timer time and the continuous number is set to have the value of the time when the user's finger 26 is off from the display 12, i.e. the dragging is ended.

The order of the dragging is not limited to the order of downward and rightward draggings, and the screen transitions to FIG. 2(*e*) may be in the order of FIGS. 2(*d*) and (*e*). Further, the screen transitions to FIG. 2(*i*) may be in the order of FIGS. 2(*d*), (*g*), (*h*) and (*i*) or FIGS. 2(*d*), (*e*), (*f*) and (*i*), meaning the combination of the transition order may be in any direction including rightward and downward directions.

Although not shown in the drawings, the self-timer time is updated to 2 seconds between FIGS. 2(*a*) and (*b*), (d) and (e), (g) and (h), etc. and displayed on the display 12. Similarly, the self-timer time is updated to 6 seconds between FIGS. 2(*b*) and (*c*), (e) and (f), (h) and (i), etc. and displayed on the display 12.

As described above, the shooting conditions for the self-timer time and the continuous shooting number are set by the respective amounts of draggings of the finger 26 from the setting icon 25 used as a reference point. In other words, the self-timer time and the continuous shooting number are respectively correspond to two dimensional coordinate values of the touch panel at the time when the finger 26 is off from the touch panel by using the setting icon 25 as the original reference point of the two dimensional coordinate system.

Although it is described in the above embodiment to set a setting time for the self-timer function and a number for continuous shooting, it is also possible to apply the present embodiment to the case where a shooting condition is set for two setting values. In specific, for example, in the automatic exposure shooting mode, automatic shooting mode can be selected such as the aperture priority mode or the shutter priority mode by the downward dragging, and an aperture setting or a shutter speed can be designated by the rightward dragging. In this case, options selected by the downward dragging may include an option whose specific setting values are not necessary such as the program automatic exposure.

As described above, in order to select a setting value by dragging a finger 26, a reference point of the dragging may be preferably positioned near a corner of the display 12 (or the touch panel 11) such as the setting icon 25 shown in FIG. 2. By positioning the reference point of the dragging near the corner, rough tracking of the dragging for respective parameters of the shooting condition becomes acceptable since the dragging ranges become relatively longer, and the parameters of the shooting condition can be preferably set even when the precision of the touch panel 11 is low. Further, the number of options can be increased.

Next, a self-timer shooting function block 30 processed in the control unit 10 is describe with reference to FIG. 3.

FIG. 3 shows a construction for setting self-timer time and continuous shooting number after the setting icon 25 is touched as shown in FIG. 2.

A manipulation status detection unit 31 acquires a coordinate value of touch point of the finger 26 in dragging on the touch panel 11. In general, a coordinate system of a touch panel ("touch coordinate") is a rectangular coordinate system with the origin at a corner of the touch panel.

The manipulation status detection unit 31 acquires the installation orientation of the shooting apparatus by an orientation detection unit 32, and performs a coordination conversion, if necessary. In this specification, a coordinate value of menu screen, etc. on the display 12 is called as "screen information coordinate value".

In specific, the orientation detection unit 32 determines the gravitational direction based on the sensor signal from the gyro sensor 21, and determines whether the shooting device is in vertical orientation or not. In case it is determined to be in vertical orientation, the axes of the touch coordinate are converted since the touch coordinate is rotated by 90 degrees, and the screen information coordinate value is acquired.

The manipulation status detection unit 31 considers the orientation of the shooting apparatus, and calculates an amount of a first direction dragging (for example, amount of downward dragging) and an amount of a second direction dragging (for example, amount of rightward dragging) with the reference point of the setting icon 25 using mathematical equations 1 and 2 as described below.

The amount of the first direction dragging (the amount of downward dragging) is represented by the Equation 1 as follows:

$$\text{int}((yn-ya)/a1) \times 2 \qquad \text{[Equation 1]}$$

The amount of the second direction dragging (the amount of rightward dragging) is represented by the Equation 2 as follows:

$$\text{int}((xn-xa)/b1) \qquad \text{[Equation 2]}$$

Here, xa and ya are values of the screen information coordinate (xa, ya) of the setting icon 25, xn and yn are values of the screen information coordinate (xn, yn) of the finger 26 in dragging. And, a1 and b1 are proportional constants for converting between screen information coordinate values and the amounts of draggings. Further, int is a function for converting parameters to integer values.

The term of "times two ($\times 2$)" in Equation 1 is for doubling the self-timer time being set, but it may be not necessary or other natural numbers may be used.

A shooting condition update unit 33 converts the amounts of the first and the second direction draggings acquired by the manipulation status detection unit 31 to a first and a second control conditions for a function to be set by using the mathematical Equations 1 and 2, respectively. Specifically, if the function to be set is the self-timer function, the first control condition is an index of the self-timer time (for example, 0, 2, 4, 6, 8 seconds, etc.), and the second control condition is an index of the continuous shooting number (for example, 1, 2, 3 shootings, etc.).

The manipulation status detection unit 31 and the shooting condition update unit 33 calculate respective control conditions by using a setting value generation table 16 of the storing unit 13.

The shooting condition update unit 33 notifies the calculated first and second control conditions to a display control unit 34 in responsive to the dragging.

As shown in respective drawings in FIGS. 2(*a*) to 2(*i*), the display control unit 34 displays the values of the first and second control conditions on the display 12, which are updated, by using the first and second control conditions respectively as the self-timer time and the continuous shooting number, so that the values of the self-timer time and the continuous shooting number can be visually recognized. By this, since the self-timer time and the continuous shooting number are updated and displayed as the dragging of the finger 26 goes, it is possible to make a desired setting.

A shooting condition setting unit 35 acquires the first and second control conditions at the point where the finger 26 is off from the touch panel 11 (i.e. the end point of the dragging) from the shooting condition update unit 33, and stores them as the shooting condition of the self-timer shooting in, for example the working memory 15 of the storing unit 13.

A shooting control unit 36 controls the shooting of an imaging unit 20 based on the self-timer time and the continuous shooting number in the storing unit 13 stored by the shooting condition setting unit 35 when a push of a shutter of a manipulation unit 18 or a touch of a shutter button icon on the display 12 is detected.

Next, FIGS. 4 to 6 show a process flow as a program operation for the control unit 10 to perform the self-timer setting function described above with reference to FIG. 3.

FIG. 4 is a flow chart for explaining an overall setting process according to the first embodiment. FIG. 3 is also referred to when necessary.

First, the manipulation status detection unit 31 detects whether the self-timer setting icon 25 is touched or not (S41), determines that other setting icon or the others is touched in case the self-timer setting icon 25 is not touched ("No" in S41), performs other process according to the touch (S43), and ends the process.

In the above step S41, in case the manipulation status detection unit 31 detects that the self-timer setting icon 25 is touched ("Yes" in S41), a detection direction determination process (S42) is performed.

A detailed flow of the detection direction determination process (S42) is described later with reference to FIG. 5, but in case the shooting apparatus is in vertical orientation, the touch coordinate of the touch panel 11 is converted into the screen information coordinate of the display 12 by rotating the touch coordinate by 90 degrees, and dragging directions such as a downward or rightward direction are made to correspond to coordinate axes.

Next, the manipulation status detection unit 31 determines whether a dragging manipulation in a downward direction or rightward direction is detected or not (S44). This determination is performed in order to remove a dragging to the upward or leftward screen from the setting icon 25 of the self-timer. In the step S44, in case downward or rightward dragging manipulation is not detected ("No" in S44), the process is stopped.

In the step S44, in case downward or rightward dragging manipulation is detected by the manipulation status detection unit 31 ("Yes" in S44), the shooting condition setting unit 35 performs a shooting condition setting process S45.

A detailed flow of the shooting condition setting process S45 is described later with reference to FIG. 6, but in this process, the setting values of the self-timer time and the continuous shooting number corresponding to the position of the finger 26 in dragging are updated and displayed, and the shooting condition of the self-timer shooting is set to be the values of the self-timer time and the continuous shooting number corresponding to the position of the finger 26 at the moment when the finger 26 is off from the touch panel 11 in case the user stopped dragging by taking the finger 26 off from the touch panel 11.

After the step S45, the display control unit 34 performs a process for removing the display of the setting values on the display 12, and stops the process. By the process of the step S46, the setting value of the self-timer time and the continuous shooting number displayed on the display 12 are removed, and other process can be performed as necessary.

Next, a detailed flow of the detection direction determination process S42 (see FIG. 4) is described with reference to FIG. 5.

First, the orientation detection unit 32 performs a process for detecting the orientation of the shooting apparatus based on the sensor signal from the gyro sensor 21 (S421). By this process, it is detected whether the shooting apparatus is in vertical orientation or not.

In the step S422, the manipulation status detection unit 31 adjusts x and y axes of the screen according to the orientation of the shooting apparatus detected by the orientation detection unit 32. In other words, in the step S421, in case the shooting apparatus is detected to be in vertical orientation, the touch coordinate of the touch panel 11 is converted by 90 degrees into the screen information coordinate of the display 12.

In case the shooting apparatus is in vertical orientation, there are cases where the left side of the shooting apparatus is the top side or the right side is the top side, and the manipulation status detection unit 31 performs the conversions of the touch coordinate axes and the increase and decrease directions according to the detected top side.

Next, a detailed flow of the shooting condition setting process S45 (see FIG. 4) is described with reference to FIG. 6.

First, the manipulation status detection unit 31 detects a current touch point S451. Specifically, the touch point is a converted touch coordinate value of the touch panel 11 according to the orientation of the shooting apparatus, and is used as a screen information coordinate value of the display 12.

Then, the manipulation status detection unit 31 calculates a difference between the center coordinate values of the setting icon of the self-timer and a current touch point (S452). In other words, the manipulation status detection unit 31 acquires the amounts of the downward and rightward draggings from the difference between the coordinate values of the finger 26's position in dragging and the center of the setting icon 25 of the self-timer.

Then, the shooting condition update unit 33 calculates a setting value(s) from the difference (i.e. dragging amount) acquired by the manipulation status detection unit 31. Here, the setting value(s) means a shooting condition including a self-timer time and/or a continuous shooting number for self-timer shooting. Preferably, the shooting condition update unit 33 may memorize the above described mathematical equations 1 and 2, calculate the self-timer time by using the mathematical equation 1 based on the downward dragging amount acquired at the step S452, and calculate the continuous shooting number by using the mathematical equation 2 based on the rightward dragging amount acquired at the step S452.

Then, the shooting condition setting unit 35 updates the stored value(s) with the setting value(s) described above (S454). This setting value(s) is/are stored, for example, in the working memory 15 of the storing unit 13 (see FIG. 1).

Next, the display control unit 34 displays the setting value(s) and the drag mark(s) 74 and/or 75 corresponding to the setting value(s) on the display 12 while being updated (S455). By this, the user may visually recognize the setting value(s) of the self-timer time and/or the continuous shooting number corresponding to the current touch point.

Then, the manipulation status detection unit 31 detects the end of touch (S456). In case the finger 26 is in touch with the touch panel 11 ("No" in S456), it means the dragging still continues so the process returns to the step S451.

In the above described step 456, in case the finger 26 is not in touch with the touch panel 11 ("Yes" in S456), the manipulation status detection unit 36 stops to process of FIG. 6, and the process returns to the process shown in FIG. 4.

As described above, the display control unit 34 displays value(s) available for setting the self-timer time and/or the continuous shooting number being updated according to the dragging of the finger 26 by repeatedly performing the process of the steps S451 to S455 until the manipulation status detection unit 31 detects the end of the touch in the step S456. By this, a user may adjust the dragging of the finger 26 according to the change of the displayed value(s), and change the value(s) for setting the self-timer time and the continuous shooting number. Further, the user may set the value(s) for the self-timer time and/or the continuous shooting number by taking the finger 26 off from the touch panel 11.

The Second Embodiment

According to the above described first embodiment, the setting value(s) for the self-timer time and/or the continuous shooting number may change jointly by the dragging of the finger 26. Now, according to the present embodiment (the second embodiment), an autofocus (AF) position setting which automatically focuses on an object at a touch point when the finger 26 touches on the display 12, and a setting for a self-timer timer and/or a continuous shooting number by the dragging of the finger 26 are sequentially performed, and a self-timer shooting or a conventional shooting is performed when the finger 26 is off from the display 12.

FIGS. 7(a) to 7(d) are schematic diagrams showing how to set a AF position by touching the display 12 (or touch panel 11) and a time for self-timer and/or a shooting number for continuous shooting by the two-direction dragging of the finger 26 according to the second embodiment of the present invention. Each screen of FIGS. 7(a) to 7(d) shows displayed contents when a point of the display 12 (or touch panel 11) is touched. Further, although not shown in the drawings, a live view image being captured by the imaging unit 20 is being continuously displayed on the display 12.

A process for setting of the AF position and the self-timer time according to the second embodiment starts when the finger 26 touches on a point on the display 12, as shown in FIG. 7(a). A mark 71 shown in FIG. 7(a) shows an AF position set by the touch, and the AF position is designated as any point on the display 12. In this case, a dragging direction for setting the self-timer time is shown as a guiding arrow 72 on the display 12.

As for the screen as shown in FIG. 7(a), if the user drags the finger 26 downwards according to the guiding arrow 72, the screen changes to a screen shown in FIG. 7(c) via a screen shown in FIG. 7(b).

On the screen as shown in FIG. 7(b), a drag mark 74 indicating a downward dragging is in progress and a drag mark 75 with a setting value ("4" in this case) for the self-timer time are displayed while being updated. The self-timer time ("4") is set by the amount of the downward dragging.

The user may proceed the dragging downwards further and stop the dragging when the self-timer time shown on the drag mark 75 becomes, for example "8", and then maintain the finger 26 on the touch point for a predetermined time. By this, the screen changes to that shown in FIG. 7(c).

On the screen as shown in FIG. 7(c), a drag mark 74 indicating a downward dragging is in progress and a drag mark 75 with a setting value ("8" in this case) for the self-timer time are displayed while being updated. Further, a dragging direction for setting the continuous shooting number is shown as a guiding arrow 73.

The screen as shown in FIG. 7(d) shows a case where the user drags the finger 26 rightwards according to the guiding arrow 73. On the screen as shown in FIG. 7(d), drag marks 74 and 75, a value ("8×2" in this case) for setting the self-timer time and the continuous shooting number, and the guiding arrow 73 in the rightward direction are displayed.

Although not shown in the drawings, if the user drags the finger 26 rightwards further, the value for setting the self-timer time and the continuous shooting number is displayed as, for example "8×3". In this case, if the user takes the finger 26 off from the touch panel 11 (i.e. the user ends the dragging), the continuous shooting number is set to 3 and a shooting is performed after 8 seconds.

Also not shown in the drawings, the self-timer time of two (2) seconds is displayed being updated on the screen between the screens as shown in FIGS. 7(a) and 7(b). The self-timer time of six (6) seconds is displayed being updated on the screen between the screens as shown in FIGS. 7(b) and 7(c).

As described above, according to the shooting apparatus of the second embodiment, the self-timer time and the continuous shooting number are set by the amount of respective downward and rightward draggings of the finger 26 sequentially. Further, if the user maintains the touch on a point for a predetermined time, the direction of dragging (i.e. the type of setting condition) is changed.

Since the self-timer time and the continuous shooting number are displayed being updated, and the self-timer time and the continuous shooting number are set in a sequential order, an elaborated adjustment of dragging is not necessary and the setting is easily performed.

According to the embodiment described above with reference to FIG. 7, an example of making an upper-left corner of the display 12 as an AF position (shown as mark 71 in the drawing) and a reference point of a dragging for setting the self-timer time and the continuous shooting number is described, but if the AF position is made to be on the lower-right area of the display 12, the dragging range of the finger 26 becomes narrower.

Figure 8:
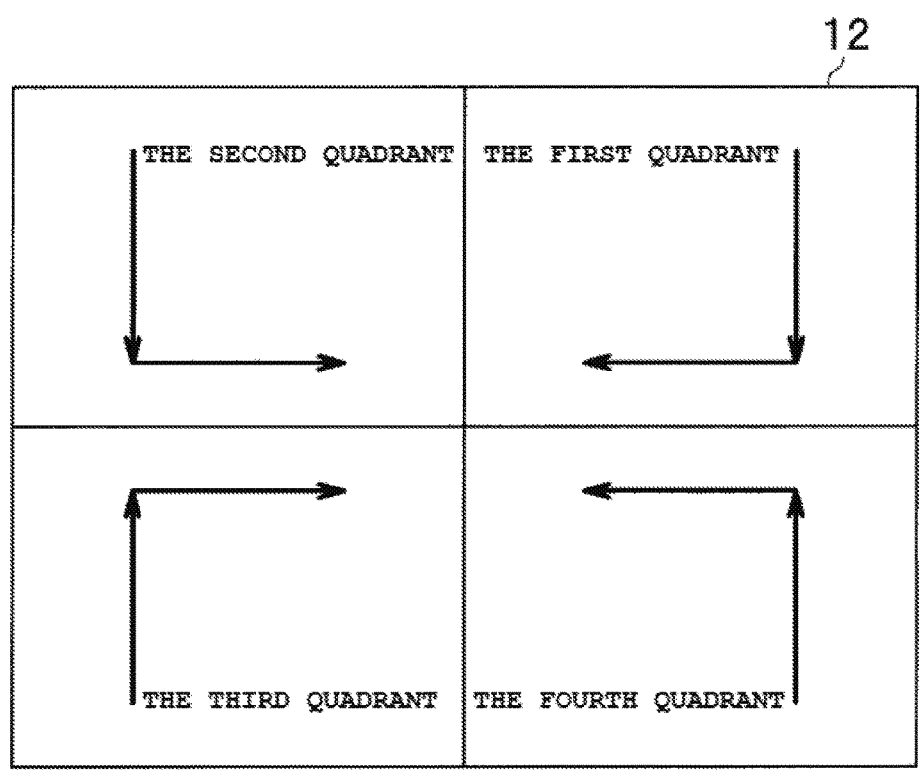
FIG. 8 shows four (4) quadrants of display area of a display according to the second embodiment of the present invention.

Due to this, according to a method shown as in FIG. 8, the user may designate a setting value(s) by making an arbitrary point of the display 12 as a reference point (i.e. AF position). Specifically, according to the shooting apparatus of the second embodiment, it is possible to designate a AF position for a group photo and set the self-timer time and the continuous shooting number all together.

Particularly, as shown in FIG. 8, the display area of the display 12 may be divided into four (4) sub-areas ("quadrants"), and, the combination of the dragging directions of the finger 26 for designating the setting value(s) of the self-timer time and the continuous shooting number may be made to differ in each sub-area.

First, in case a point in the second quadrant of the display 12 is made to be a reference point for the dragging, as described above with reference to FIG. 7, a self-timer time may be set by a downward dragging with a guiding arrow 72, which indicates a dragging direction for setting a self-timer time, being displayed in the downward direction, and then, a continuous shooting number may be set by a continued rightward dragging with a guiding arrow 73, which indicates a dragging direction for setting a continuous shooting number, being displayed in the rightward direction.

In this case, the display positions of the guiding arrows 72 and 73 may be near the corner of the end-side of the dragging, which is in vertically symmetrical area to the area where the finger 26 is being dragged. By this, chances for the guiding arrows to be hidden by the user's hand become low.

In case a point in the first quadrant of the display 12 is made to be a reference point for the dragging, a self-timer time may be set by a downward dragging with a guiding arrow 72 being displayed in the downward direction, and then, a continuous shooting number may be set by a continued leftward dragging with a guiding arrow 73 being displayed in the leftward direction.

In case a point in the third quadrant of the display 12 is made to be a reference point for the dragging, a self-timer time may be set by an upward dragging with a guiding arrow 72 being displayed in the upward direction, and then, a continuous shooting number may be set by a continued rightward dragging with a guiding arrow 73 being displayed in the rightward direction.

In case a point in the fourth quadrant of the display 12 is made to be a reference point for the dragging, a self-timer time may be set by an upward dragging with a guiding arrow 72 being displayed in the upward direction, and then, a continuous shooting number may be set by a continued leftward dragging with a guiding arrow 73 being displayed in the leftward direction.

As described above, since it is possible to perform the dragging in at least a quarter of the display area of the display 12 by dividing the display area of the display 12 into four (4) sub-areas and making a different combination of the dragging directions of the finger 26 for designating setting value(s) of the self-timer time and the continuous shooting number for each of the different sub-areas where the reference point of the dragging (i.e. AF position) is positioned, it is possible to designate an arbitrary point as an AF position as well as set a shooting condition of a self-timer without reducing the operability.

Additionally, the setting value(s) may be adjusted by a dragging in reverse direction against the above described downward or upward and/or rightward or leftward dragging. Specifically, for example, since the self-timer time is set by the downward dragging in the first quadrant, after the self-timer time is set to, for example, eight (8) seconds by the downward dragging, and then the set time can be adjusted to four (4) seconds by an upward dragging.

By allowing this reverse direction dragging, it becomes much easier to set a self-timer time and a continuous shooting number.

Figure 9:
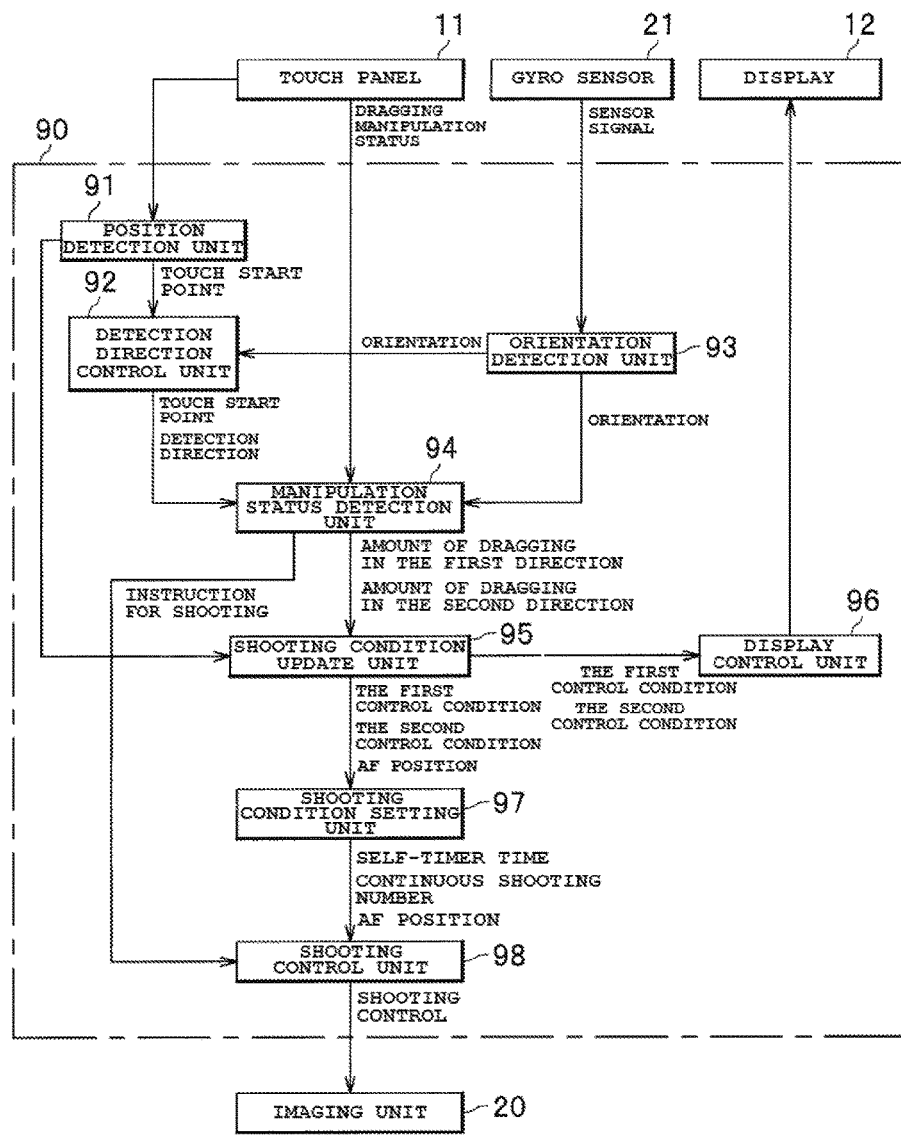
FIG. 9 is a functional block diagram according to the second embodiment of the present invention.

Next, with reference to a functional block diagram as shown in FIG. 9, a control process of a function block 90 of the self-timer shooting processed by the control unit 10 according to the second embodiment will be described in detail.

FIG. 9 shows a construction for performing a self-timer time and a continuous shooting number setting, AF position designation and shooting after the process started by touching a point on the display 12 as described above with reference to FIG. 8.

A position detection unit 91 acquires a touch coordinate value of the finger 26 in dragging on the touch panel 11 and gets a touch start point.

In this case, an orientation detection unit 93 determines the gravitational direction based on the sensor signal of the gyro sensor 21 and determines whether the shooting apparatus is in vertical orientation or not. This is to acquire a screen information coordinate by changing the axes of the touch coordinate since the touch coordinate rotates 90 degrees if the shooting apparatus is determined to be in the vertical orientation.

As described above with reference to FIG. 8, in order to change the dragging direction for setting according to the quadrant area where the drag reference point belongs, a detection direction control unit 92 changes the touch start point to a screen information coordinate value based on the touch start point acquired by the position detection unit 91 and the orientation information of the shooting apparatus determined by the orientation detection unit 93, and get a dragging direction for setting in a quadrant where the touch start point belongs.

A manipulation status detection unit 93 gets an amount of a first direction dragging (e.g. amount of upward or downward dragging) and an amount of a second direction dragging (e.g. amount of leftward or rightward dragging) from the touch coordinate value of the finger 26 in dragging on the touch panel by using mathematical equations 3 and 4 included in the setting value generation table 16 of the storing unit 13 in consideration of the orientation determined by the orientation detection unit 93, the touch start point inputted by the detection direction control unit 92 and the dragging direction for setting.

The amount of the first direction dragging (e.g. amount of upward or downward dragging) may be represented by Equation 3 as follows:

$$\text{int}((yn-y0)/a2) \times 2 \qquad [\text{Equation 3}]$$

The amount of the second direction dragging (e.g. amount of leftward or rightward dragging) may be represented by Equation 4 as follows:

$$\text{int}((xn-x0)/b2) \qquad [\text{Equation 4}]$$

Here, $x0$ and $y0$ are values of the screen information coordinate $(xa, ya)$ of the touch point, $xn$ and $yn$ are values of the screen information coordinate $(xn, yn)$ of the finger 26 in dragging. And, $a2$ and $b2$ are proportional constants for converting between screen information coordinate values and the amounts of draggings. Further, int is a function for converting parameters to integer values. The term of "times two ($\times 2$)" in Equation 3 is for doubling the self-timer time being set, but it may be not necessary or other natural numbers may be used as in the case of the Equation 1.

Further, a manipulation status detection unit 94 acquires the touch coordinate value from the touch panel 11, and information whether the finger 26 is in touch with the touch panel 11 or not. Although described in detail later, according to the second embodiment, there is included a mode where a shooting operation starts according to the set self-timer time and continuous shooting number after the self-timer shooting condition is set. The manipulation status detection unit 94 instructs a shooting control unit 98 to take a shooting by determining that the finger 26 is off from the touch panel 11.

A shooting condition update unit 95 converts the amounts of the first and second direction draggings acquired by the manipulation status detection unit 94 into a first and a second control conditions for a function to be set by using the mathematical Equations 3 and 4. Specifically, if the function to be set is the self-timer function, the first control condition is an index of the self-timer time (for example, 0, 2, 4, 6, 8 seconds, etc.), and the second control condition is an index of the continuous shooting number (for example, 1, 2, 3 shootings, etc.).

Further, the shooting condition update unit 95 outputs the first touch point as an AF position.

The shooting condition update unit 95 notifies to a display control unit 96 of the first and/or second control condition(s) corresponding to dragging.

The display control unit 96 visually displays the first and second control conditions as values of the self-timer time and the continuous shooting number in order for them to be recognizable as shown in each screen of FIGS. 7(*a*) to 7(*d*).

By this, a desired setting can easily be performed since the values of the self-timer time and the continuous shooting number are displayed according to dragging.

A shooting condition setting unit 97 acquires the first and second control conditions and the AF position at the end point of the dragging from the shooting condition update unit 95 when the finger 26 is off from the touch panel 11, stores them as the self-timer time, the continuous shooting number and the AF position of the shooting conditions to the working memory 15 of the storing unit 13.

A shooting control unit 98 controls a shooting of the imaging unit 20 according to the shooting instruction from the manipulation status detection unit 94 based on the setting of the self-timer time and the continuous shooting number stored in the storing unit 13 by the shooting condition setting unit 97 when the finger 26 is off from the touch panel 11.

Figure 10:
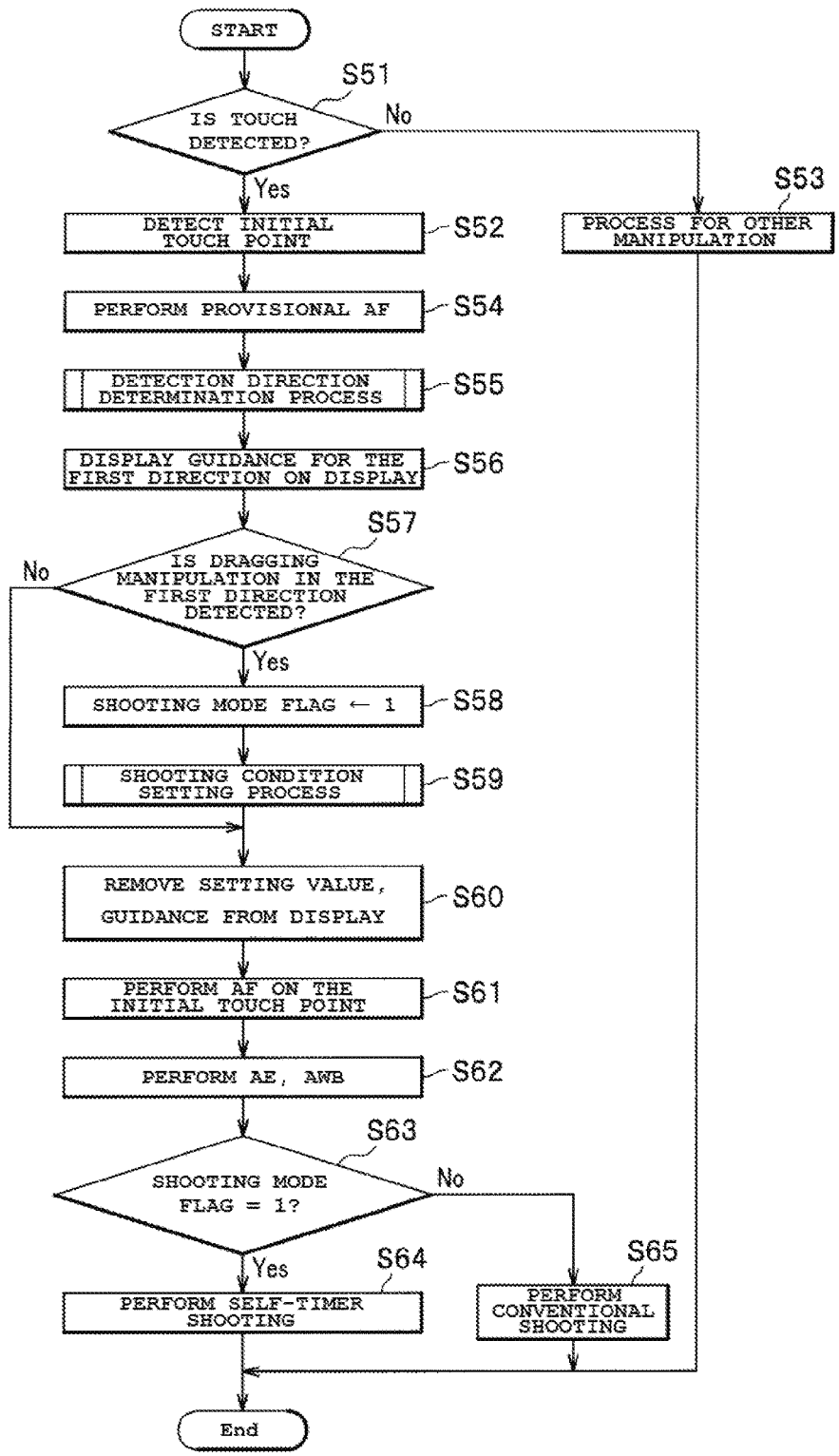
FIG. 10 is a flow chart for explaining a setting process according to the second embodiment of the present invention.
Figure 11:
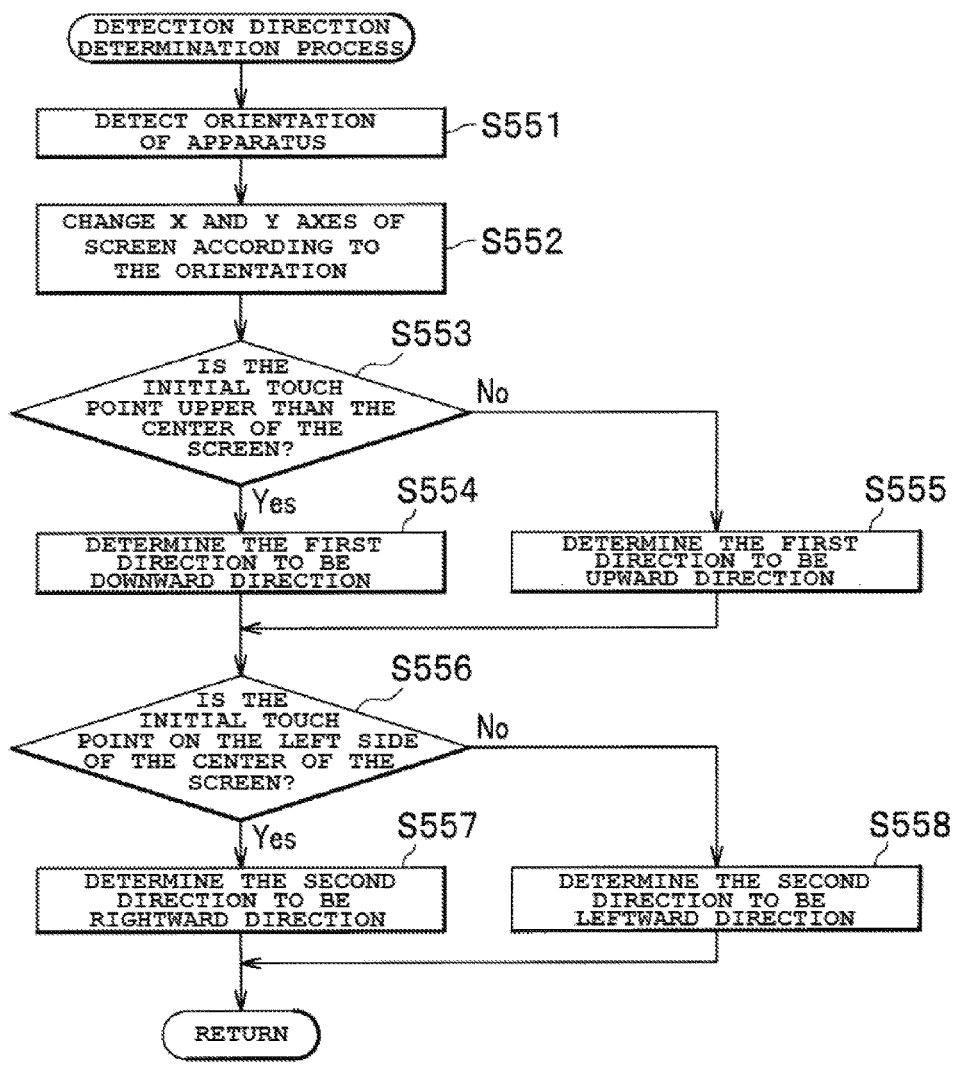
FIG. 11 is a detailed flow chart for explaining a detection direction determination process according to the second embodiment of the present invention.

Next, FIGS. 10 to 12 show a process flow as a program operation for the control unit 10 to perform the self-timer setting function with an arbitrary point on the touch panel 11 as a reference point of dragging described above with reference to FIG. 9.

FIG. 10 is a flow chart for explaining an overall setting process according to the first embodiment. FIG. 9 is also referred to when necessary.

First, the position detection unit 91 detects whether a point on the touch panel 11 is touched or not (S51), and in case it is determined that the touch panel 11 is not touched ("No" in S51), processes other process according to other manipulation (S53), and then stops the process.

In the above step S51, in case it is determined that a point on the touch panel 11 is touched ("Yes" in S51), the position detection unit 91 detects the initial touch point (S52). This initial touch point becomes the AF position, and also becomes the reference point of dragging for setting shooting condition for the self-timer.

Next, the shooting control unit 98 performs a provisional AF performing process (S54) for focusing on the initial touch point by the imaging unit 20. By this, since the live view image becomes an image focused on the initial touch point, the focus for the self-timer shooting can be recognized.

Next, as described above with reference to FIG. 8, the detection direction control unit 92 performs a detection direction determination process (S55) where a combination of the dragging directions for designating a setting value(s) are determined based on the screen area (i.e. the quadrant) where the initial touch point belongs. Although described in detail later with reference to FIG. 11, the first direction (i.e. the first dragging direction) for setting the self-timer time and the second direction (i.e. the second dragging direction) for setting the continuous shooting number are determined.

Further, the display control unit 96 displays a guidance for the first direction determined in the above described step S55 on the display 12. Specifically, the display control unit 96 displays a guiding arrow 72 as shown in FIG. 7 according to the first direction determined in the step S55 on the display 12.

The user drags the finger 26 along with the direction of the guiding arrow 72, and sets the self-timer. The manipulation status detection unit 94 determines whether a dragging manipulation of the finger 26 is detected or not (S57), and in case it is detected ("Yes" in S57), continues the process for setting the shooting condition of the self-timer by the dragging of the user's finger 26.

In this case, the manipulation status detection unit 94 sets "one (1)" to a shooting mode flag (S58).

Further, as described in detail later, the shooting condition setting process (S59) is performed where a dragging of the finger 26 in the first direction sets a self-timer time and a consecutive dragging of the finger 26 in the second direction sets a continuous shooting number.

The step S59 continues until the finger 26 is off from the touch panel 11, and if the self-timer time and the continuous shooting number are set, the process proceeds to the next step S60.

By the way, in the above step S57, in case the dragging of the finger 26 in the first direction is not detected ("No" in S57), the process proceeds to the step S60.

This path of the process is so-called a "touch shutter shooting" where a conventional shooting (S65) not the self-timer shooting is performed after the AF position is designated. Because of this, the shooting mode flag is not set to "one (1)". Further, the determination of dragging manipulation in the step S57 includes whether the finger 26 is in touch with the touch panel 11 or not.

In the step S60, the display control unit 96 removes the display of the setting value and/or the guidance on the display so that the guiding arrow 72 or 73 or the drag mark 74 or 75 as shown in FIG. 7 is not displayed on the display 12. By this, the user may visually recognize that the shooting is ready.

Further, the shooting control unit 98 performs a autofocus process (S61) for the initial touch point acquired in the step S52. By this, a focus change due to a movement of an object during the process of setting the shooting condition can be compensated.

Next, the shooting control unit 98 performs AE (Automatic Exposure) and AWB (Automatic White Balance) (S62). By this, adjustments for exposure and white balance for image shooting are performed.

When the above described step S62 is ended, the shooting control unit 98 determines whether the shooting mode flag is set to "one (1)" or not (S63), and, in case the shooting mode flag is set to "one (1)" ("Yes" in S63), the self-timer shooting is performed (S64), and then the process is stopped.

In case it is determined that the shooting mode flag is not set to "one (1)" in the step S63 ("No" in S63), the shooting control unit 98 performs a conventional shooting (S65) like when the shutter button is pushed or the shutter button icon displayed on the display 12 is touched, and then the process is stopped. By this, a conventional shooting with an AF position designated by touching the display 12 can be performed.

Next, the detection direction determination process of the above described step S55 (see FIG. 10) is described in detail with reference to FIG. 11.

First, the orientation detection unit 93 performs a process for detecting the orientation of the shooting apparatus (S551). By this, it is detected whether the shooting apparatus is in vertical orientation or not.

In the step S552, the detection direction control unit 92 changes x and y axes for the screen according to the detected orientation of the shooting apparatus. In other words, if the shooting apparatus is detected to be in the vertical orientation by the orientation detection unit 93 in the step S551, the detection direction control unit 92 rotates the touch coordinate of the touch panel 11 to 90 degrees, and converts it into the screen information coordinate of the display 12.

In case the shooting apparatus is in vertical orientation, there are cases where the left side of the shooting apparatus is the top side or the right side is the top side, and the detection direction control unit 92 performs the conversions of the touch coordinate axes and the increase and decrease directions according to the detected top side.

Next, the detection direction control unit 92 determines whether the initial touch point converted into the screen information coordinate belongs to an area upper than the center of the screen or not (S553). This is to determine whether the initial touch point belongs to either the first or the second quadrant as shown in FIG. 8 or not.

In the step S553, in case it is determined that the initial touch point belongs to an area upper than the center of the screen, in other words the initial touch point belongs to the first or the second quadrant ("Yes" in S553), the detection direction control unit 92 determines that the first direction (i.e. the first dragging direction) is the downward direction (S554). Here, the first direction (i.e. the first dragging direction) is a direction for setting the self-timer time.

In the step S553, in case it is determined that the initial touch point does not belong to an area upper than the center of the screen, in other words the initial touch point belongs to the third or the fourth quadrant ("No" in S553), the detection direction control unit 92 determines that the first direction (i.e. the first dragging direction) is the upward direction (S555).

After the step S554 or S555, the detection direction control unit 92 determines whether the initial touch point converted into the screen information coordinate is on the left side of the center of the screen or not (S556). This is to determine whether the initial touch point belongs to either the second or the third quadrant as shown in FIG. 8 or not.

In the step S556, in case it is determined that the initial touch point is on the left side of the center of the screen, in other words the initial touch point belongs to the second or the third quadrant ("Yes" in S556), the detection direction control unit 92 determines that the second direction (i.e. the second dragging direction) is the rightward direction (S557). Here, the second direction (i.e. the second dragging direction) is a direction for setting the continuous shooting number.

In the step S556, in case it is determined that the initial touch point is not on the left side of the center of the screen, in other words the initial touch point belongs to the first or the fourth quadrant ("No" in S556), the detection direction control unit 92 determines that the second direction (i.e. the second dragging direction) is the leftward direction (S558).

By the above described, the first direction (i.e. the first dragging direction) for setting the self-timer time and the second direction (i.e. the second dragging direction) for setting the continuous shooting direction can be determined based on the initial touch point.

Next, a detailed flow of the shooting condition setting process of the above described step S59 (see FIG. 10) is described with reference to FIG. 12.

First, the detection direction control unit 92 determines a current touch point (S591). Specifically, the touch point is the one of the screen information coordinate of the display 12 converted from the touch coordinate of the touch panel 11 according to the orientation of the shooting apparatus.

Then, the manipulation status detection unit 94 calculates the difference in the first direction (i.e. the first dragging direction) between the initial touch point and the current touch point (S592). Specifically, in case the initial touch point belongs to the second quadrant, the manipulation status detection unit 94 calculates an amount of dragging in the downward direction from the coordinate values of the current touch point and the initial touch point of the finger 26 in dragging. In case the initial touch point belongs to the fourth quadrant, the manipulation status detection unit 94 calculates an amount of dragging in the upward direction.

Next, the shooting condition update unit 95 calculates a setting value from the difference (i.e. the amount of dragging) calculated by the manipulation status detection unit 94 (S593). Here, the setting value is a self-timer time setting value which is a shooting condition for the self-timer shooting. Specifically, with the Equation 3 stored in memory, it is preferable to calculate the self-timer time setting value by using the Equation 3 based on the amount of dragging calculated in the step S592.

Further, the shooting condition setting unit 97 updates the stored value with the setting value calculated in the step S593 (S594). This setting value is stored in, for example, the working memory 15 of the storing unit 13 (see FIG. 1).

Then, the display control unit 96 displays the setting value calculated in the step S593, and the drag mark 74 or 75 corresponding to the setting value on the display 12 while being updated (S595). By this, the user may visually recognize the setting value of the self-timer time corresponding to the current touch point. An example of the display screen of the step S595 is shown in FIG. 7(b). As shown in FIG. 7(b), a drag mark 75 with the setting value of "4" for the self-timer time to be set, a drag mark 74 indicating that the downward dragging is being performed, and a guiding arrow 72 indicating that the dragging should be performed in the downward direction are displayed on the screen of the display 12.

Next, the manipulation status detection unit 94 determines the dragging manipulation (S596). In case the manipulation status detection unit 94 detects that the dragging manipulation is paused, the process continues to the step S597, and in case the manipulation status detection unit 94 detects the end of the touch, the process of FIG. 12 is stopped and returns to the process of FIG. 10. Further, in case the dragging manipulation is detected to continue, the process returns to the step S591 and repeats to perform the processes of the steps S591 to S595.

The manipulation status detection unit 94 determines whether the dragging manipulation is paused or not by detecting the change in touch point. The detection of the pause of the dragging manipulation is performed in order to detect the change of the dragging direction from the first direction to the second direction.

Specifically, the manipulation status detection unit 94 determines that the dragging is paused in case the change of the touch point acquired in the step S591 is less than a predetermined value for a predetermined time.

Further, if the touch panel 11 can detect a touch pressure of the finger 26, the determination of the pause of the dragging in the step S596 may be determined by the change in the touch pressure. Specifically, the manipulation status detection unit 94 may acquire the touch point and the touch pressure together in the step S591, calculate the change of the touch pressure in the step S596, and determine that the dragging is paused in case the touch pressure is lager than a threshold value for a predetermined time.

Further, the manipulation status detection unit 94 may calculate the change in the dragging direction, and determined that the dragging is paused in case the change in the dragging direction from the initial touch state is larger than a predetermined value.

In the step S596, in case the manipulation status detection unit 94 detects that the dragging is paused, the setting for the self-timer time in the first direction is completed and the process continues to the process for setting the continuous shooting number in the second direction.

First, the shooting condition update unit 95 displays a guidance for the second direction on the display 12 in accordance with the display control unit 96 (S597). For example, in case the initial touch point belongs to the second quadrant, the shooting condition update unit 95 displays a guiding arrow 73 in the rightward direction on the display 12 as shown in FIG. 7(c).

The user may recognize the dragging direction of the finger 26 for setting the continuous shooting number by the guiding arrow 73.

Further, the detection direction control unit 92 detects the current touch point (S598). Specifically, the touch point is the one of the screen information coordinate of the display 12 converted from the touch coordinate of the touch panel 11 according to the orientation of the shooting apparatus.

Next, the manipulation status detection unit 94 calculates the difference in the second direction (i.e. the second dragging direction) between the initial touch point and the current touch point (S599). Specifically, in case the initial touch point belongs to the second quadrant, an amount of dragging in the rightward direction is calculated from the coordinate values of the current touch point and the initial touch point of the finger 26 in dragging. In case the initial touch point belongs to the fourth quadrant, the manipulation status detection unit 94 calculates an amount of dragging in the leftward direction.

Further, the shooting condition update unit 95 calculates a setting value from the difference (i.e. the amount of dragging) calculated as above (S600). Here, the setting value is a self-timer time setting value which is a shooting condition for the continuous shooting number. Specifically, with the Equation 4 stored in memory, it is preferable to calculate the continuous shooting number of the self-timer setting value by using the Equation 4 based on the amount of dragging calculated in the step S599.

Further, the shooting condition setting unit 97 updates the stored value with the setting value calculated in the step S600 (S601).

Then, the display control unit 96 displays the setting value calculated in the step S600 on the display 12 while being updated (S602). By this, the user may visually recognize the setting value of the continuous shooting number corresponding to the current touch point. An example of the display screen of the step S602, as shown in FIG. 7(*d*), displays a drag mark 75 with the setting value of "8×2" for the combination of the continuous shooting number of "2" and the self-timer time of "8" as previously set. In this case, the drag mark 75 is displayed to be long in the horizontal direction in order to indicate the dragging is in that direction.

Finally, the manipulation status detection unit 94 determines whether the touch is ended or not (S603). In case the finger 26 is detected to be in touch with the touch panel 11 ("No" in S603), it means that the dragging is still going on, and the process returns to the step S598.

In the step S603, in case the finger 26 is detected to be off from the touch panel 11 ("Yes" in S603), the process of FIG. 12 is stopped and returns to the process of FIG. 10.

Since the difference between the initial touch point and the current touch point is calculated during the dragging of the finger 26 in the first and/or second direction, it is possible to manipulate to reverse the setting value by dragging in the reverse direction while the dragging being performed. Specifically, it is possible to perform a manipulation for revising, for example the self-timer time from "8" to "4" by consecutively dragging in the upward direction while the downward dragging (i.e. in the first direction) being performed.

As described above, since the setting for the self-timer time and the continuous shooting number are performed by dividing the dragging direction into two directions of the first and second directions, the manipulation gets easier. Each setting value is decided by the component of the dragging designation direction (i.e. the amount of the dragging in that direction), the resulting dragging direction may be off from the designated dragging direction. Thus, even in case the detection resolution of the touch panel 11 is not high, it is possible to set the shooting condition parameter(s). In other words, if the first direction is designated to be in the downward direction, the resulting dragging direction may not be exactly the downward direction. If the second direction is designated to be in the rightward direction, the resulting dragging direction may off from the rightward direction. Further, since the second shooting condition is decided after the first shooting condition is decided, the fact that the rightward dragging is not exactly in the rightward direction does not affect the first shooting condition. By this, the user may easily set each of the shooting condition.

According to the shooting condition setting process as shown in FIG. 12, the difference between the initial touch point and the current touch point is calculated in the steps S592 and S599. Among them, the step S599 may be modified so that the difference is calculated between a point where a dragging is detected to be paused ("drag pause point") and the current touch point. By this, the difference can be calculated from a touch point where the dragging direction is changed (i.e. an inflection point of dragging) to the current touch point, and the setting value can be calculated from the difference value, and thereby a third direction can be additionally designated so that three setting values can be set.

For example, the dragging directions can be designated to be the downward, rightward and downward directions, and each of the self-timer time, the continuous shooting number and the shooting interval can be set by each of the dragging in each direction.

The above described method for setting the self-timer time and the continuous shooting number by dividing the dragging direction into two different directions of the first and second directions, may be applied to the case for setting a setting value corresponding to, for example the setting icon 25 by touching the setting icon 25 as described above about the first embodiment. In this case, since it is possible to display a plurality of setting icons, to select setting contents and to set setting values corresponding to the selected setting icons all together, the usability of the apparatus is increased.

Further, the present invention is not limited to the above described embodiments, and includes various variations. The above embodiments are described in detail for the purpose of easy understandings, and the present invention is not limited to a construction including all of the above described elements. Further, some elements of some embodiments may be replaced by or added to other elements of other embodiments.

By the way, variations of embodiments of the present invention may include (1) to (8) as follows:

(1) According to the above described embodiments, the setting value(s) for the first and/or second shooting condition(s) is/are updated according to the manipulation status of the dragging. However, the value(s) being updated may be the one(s) which is/are being displayed, and the setting value(s) may be finally set after the finger 26 is completely off from the touch panel 11.

(2) According to the above described embodiments, the first and/or second shooting condition(s) are displayed along with the manipulation of the dragging. However, the first and/or second shooting condition(s) may be displayed while being updated at a predetermined fixed position of the display.

(3) The self-timer time may be increased as the amount of the dragging, or decreased from a predetermined time (e.g. 10 seconds) as the dragging is proceeded.

(4) The manipulation status detection unit may detect the speed of the dragging as the dragging manipulation status.

(5) The coordinate of the touch start point of the first embodiment may be the point of the touch.

(6) In relation to the second embodiment, the display control unit may display guides to both of the first and second directions at the beginning of the touch, and the first and second direction manipulations may be combined as described in the first embodiment.

(7) The shooting apparatus for the above described embodiments may be enough only to include the display on which the shooting objects and shooting conditions may be displayed and the touch panel 11 on which the shooting conditions may be set by dragging of the finger 26, thus the present invention may also be applied to a smartphone, a tablet terminal, a cellular phone, a PC, etc. having camera function as well as a digital camera.

(8) In relation to the second embodiment, in case it is detected that a predetermined time has passed after returning to the drag pause point during the dragging manipulation in the second direction, the dragging manipulation in the second direction can be replaced with the dragging manipulation in the first direction. By this, the setting for the first shooting condition can be easily modified.

Further, although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. A shooting apparatus, which comprises a touch panel on a display, comprising:
    a CPU that is configured to:
    perform a position detection to detect a two dimensional touch start point on the touch panel;
    perform a detection direction control to specify a first direction according to the two dimensional touch start point detected in the position detection and a second direction according to the two dimensional touch start point detected in the position detection;
    perform a manipulation status detection to detect (i) a dragging manipulation status from the two dimensional touch start point on the touch panel to an end of the touch in the first direction and (ii) an amount of dragging in the second direction consecutive to the dragging manipulation status in the first direction, which is different from the first direction, as the dragging manipulation status;
    perform a shooting condition update to (i) update a first shooting condition based on the dragging manipulation status in the first direction detected in the manipulation status detection and (ii) update a second shooting condition which is different from the first shooting condition according to the amount of dragging in the second direction detected in the manipulation status detection;
    perform a display control to perform a control of updating and displaying the updated first shooting condition on (i) the display corresponding to the two dimensional touch start point, (ii) a fixed point on the display, or (iii) a point on the display along with the dragging manipulation status and perform a control of updating and displaying the updated second shooting condition in addition to the first shooting condition on a fixed point on the display, a point on the display corresponding to the two dimensional touch start point or a point on the display along with the dragging manipulation status.

2. The shooting apparatus of claim 1, wherein the CPU:
    performs the shooting condition update to further update one of a self-timer time and a continuous shooting number, which is different from the first shooting condition, as the second shooting condition according to the amount of dragging in the second direction detected in the manipulation status detection, and
    performs the display control to further perform the control of updating and displaying the updated second shooting condition in addition to the first shooting condition on a fixed point on the display, a point on the display corresponding to the two dimensional touch start point or a point on the display along with the dragging manipulation status.

3. The shooting apparatus of claim 2, wherein the CPU is further configured to:
    perform a position detection to detect a touch point on the touch panel, and
    perform in the manipulation status detection to detect the amounts of dragging in the first and second directions based on the two dimensional touch start point and the current touch point detected in the position detection as the dragging manipulation status.

4. The shooting apparatus of claim 1, wherein the CPU:
    performs the display control to perform a control of displaying a guidance which guides the first direction specified in the detection direction control.

5. The shooting apparatus of claim 1, wherein the CPU:
    performs a shooting condition setting to set a position on the display of an object to be captured according to the two dimensional touch start point detected in the position detection as an AF (Auto-Focus) position.

6. The shooting apparatus of claim 1, wherein the CPU: performs the display control to perform a control of displaying a guidance which guides the second direction specified in the detection direction control, in response to detecting that the dragging manipulation in the first direction is stopped.

7. The shooting apparatus of claim 1, wherein the CPU is further configured to:
    perform a shooting control to perform a control of shooting according to a shooting condition set in case the end of the dragging manipulation is detected in the manipulation status detection.

8. The shooting apparatus of claim 1, wherein the CPU is further configured to:
    perform a shooting condition setting to set final updated first shooting condition, when update of the shooting condition finish, as a shooting condition for performing a shooting.

9. The shooting apparatus of claim 1, wherein the CPU is further configured to:
    perform a shooting condition setting to set the updated first shooting condition, whenever update of the shooting condition, as a shooting condition for performing a shooting.

10. The shooting apparatus of claim 1, wherein the CPU is further configured to:
    perform the detection direction control to specify the first direction such that a user recognize the first direction without change a direction.

11. The shooting apparatus of claim 1, wherein the CPU is further configured to:
    perform an orientation detection to detect a predetermine direction for the shooting apparatus;
    perform the detection direction control to specify the first direction such that the first direction coincides with the predetermine direction in a case where an orientation of the shooting apparatus changes.

12. The shooting apparatus of claim 1, wherein the CPU is further configured to:

perform an orientation direction detection to detect a gravity direction for the shooting apparatus;

perform the detection direction control to specify the first direction such that the first direction coincides with the gravity direction or the horizontal direction of the gravity direction in a case where an orientation of the shooting apparatus change.

13. The shooting apparatus of claim 1, wherein, the first shooting condition includes condition of a self-timer time or condition of a continuous shooting number.

14. A shooting apparatus, which comprises a touch panel on a display, comprising:

a CPU that is configured to:

perform a position detection to detect a two dimensional touch start point on the touch panel;

perform a detection direction control to specify one of a plurality of directions set previously as a first direction according to the touch start point detected in the position detection and a second direction which is different from the first direction according to the two dimensional touch start point detected in the position detection;

perform a display control to perform a control of displaying a guidance which guides the first direction and the second direction specified in the detection direction control;

perform a manipulation status detection to detect a dragging manipulation status in the specified first direction and the specified second direction; and perform a shooting condition setting to set (i) a first shooting condition based on the dragging manipulation status in the first direction detected in the manipulation status detection and (ii) a second shooting condition, which is different from the first shooting condition, according to the dragging manipulation status in the second direction detected in the manipulation status detection, and wherein the CPU:

performs the display control to further perform the control of displaying a guidance which guides the second direction specified in the detection direction control, in response to detecting that the dragging manipulation in the first direction is stopped as the dragging manipulation status in the first direction.

15. The shooting apparatus of claim 14, wherein the CPU:

performs the manipulation status detection to detect an amount of dragging in the first direction as the dragging manipulation status in the first direction, and perform the shooting condition setting to set the first shooting condition according to the amount of dragging detected in the manipulation status detection.

16. The shooting apparatus of claim 14, wherein the CPU:

performs the shooting condition setting to set a position on the display of an object to be captured according to the touch start point detected in the position detection as an AF (Auto-Focus) position.

17. A shooting apparatus, which comprises a touch panel on a display, comprising:

a CPU that is configured to:

perform a position detection to detect a two dimensional touch point on the touch panel;

perform a manipulation status detection to detect (i) a dragging manipulation status in a first direction from the two dimensional touch point detected for a dragging manipulation which continues from a touch start point on the touch panel and a dragging manipulation status in a second direction which is different from the first direction from the two dimensional touch point detected for the dragging manipulation status and (ii) an amount of dragging in the second direction, which is different from the first direction;

perform a shooting condition setting to set a first shooting condition related to shooting according to the dragging manipulation status in the first direction detected in the manipulation status detection, and a second shooting condition related to the self-timer shooting according to the dragging manipulation status in the second direction detected in the manipulation status detection and update the second shooting condition which is different from the first shooting condition according to the amount of dragging in the second direction detected in the manipulation status detection; and perform a control of updating and displaying the updated second shooting condition in addition to the first shooting condition on a fixed point on the display, a point on the display corresponding to the touch start point or a point on the display along with the dragging manipulation status, and wherein the CPU:

performs the display control to further perform a control of displaying a guidance which guides the second direction specified in the detection direction control, in response to detecting that the dragging manipulation in the first direction is stopped as the dragging manipulation status in the first direction.

18. The shooting apparatus of claim 17, wherein the CPU:

performs the manipulation status detection to detect amounts of dragging in the first and second directions as the dragging manipulation status, and performs the shooting condition setting to set a self-timer time as the first shooting condition related to the self-timer shooting according to an amount of the dragging in the first direction detected in the manipulation status detection, and a continuous shooting number as the second shooting condition related to the self-timer shooting according to an amount of the dragging in the second direction detected in the manipulation status detection.

19. The shooting apparatus of claim 17, wherein the CPU is further configured to:

perform a shooting control to perform a control of shooting according to the first and second shooting conditions set in the shooting condition setting in case an end of the touch is detected in the manipulation status detection.

20. A method for setting a setting condition for a shooting apparatus, which comprises a touch panel on a display, comprising:

performing a position detection to detect a two dimensional touch start point on the touch panel;

performing a detection direction control to specify a first direction according to the two dimensional touch start point detected in the position detection and a second direction according to the two dimensional touch start point detected in the position detection;

detecting a dragging manipulation status from the two dimensional touch start point on the touch panel to an end of the touch in the first direction and an amount of dragging in the second direction consecutive to the dragging manipulation status in the first direction, which is different from the first direction, as the dragging manipulation status;

updating as a first shooting condition based on in the dragging manipulation status in the first direction being detected and update a second shooting condition which is different from the first shooting condition according to the amount of dragging in the second direction detected in the manipulation status detection;

performing a control of updating and displaying the updated first shooting condition on (i) the display, (ii) a point on the display corresponding to the two dimensional touch start point or (iii) a point on the display along with the dragging manipulation status and performing a control of updating and displaying the updated second shooting condition in addition to the first shooting condition on a fixed point on the display, a point on the display corresponding to the two dimensional touch start point or a point on the display along with the dragging manipulation status.

21. A method for shooting by a shooting apparatus, which comprises a touch panel on a display, comprising:

detecting a touch start point on the touch panel;

specify one of a plurality of directions set previously as a first direction according to the detected touch start point;

performing a control of displaying a guidance which guides the specified first direction;

detecting a dragging manipulation status in the specified first direction which continues from the touch start point on the touch panel in a first direction as the dragging manipulation status and an amount of dragging in a second direction, which is different from the first direction;

setting a first shooting condition according to the dragging manipulation status detected in the first direction and updating a second shooting condition which is different from the first shooting condition according to the amount of dragging in the second direction detected in the manipulation status detection;

performing a control of updating and displaying the updated second shooting condition in addition to the first shooting condition on a fixed point on the display, a point on the display corresponding to the touch start point or a point on the display along with the dragging manipulation status;

performing the display control to further perform a control of displaying a guidance which guides the second direction specified in the detection direction control, in response to detecting that the dragging manipulation in the first direction is stopped as the dragging manipulation status in the first direction.

22. A method for setting a shooting condition for a shooting apparatus, which comprises a touch panel on a display, comprising:

detecting a two dimensional touch point on the touch panel;

detecting a dragging manipulation status in a first direction from the two dimensional touch point detected for a dragging manipulation which continues from a touch start point on the touch panel and a dragging manipulation status in a second direction which is different from the first direction from the two dimensional touch point detected for the dragging manipulation and an amount of dragging in the second direction, which is different from the first direction; and setting a first shooting condition related to the self-timer shooting according to the dragging manipulation status detected in the first direction, and a second shooting condition related to the self-timer shooting according to the dragging manipulation status detected in the second direction and updating a second shooting condition which is different from the first shooting condition according to the amount of dragging in the second direction detected in the manipulation status detection;

perform a control of updating and displaying the updated second shooting condition in addition to the first shooting condition on a fixed point on the display, a point on the display corresponding to the touch start point or a point on the display along with the dragging manipulation status; and performs the display control to further perform a control of displaying a guidance which guides the second direction specified in the detection direction control, in response to detecting that the dragging manipulation in the first direction is stopped as the dragging manipulation status in the first direction.

23. A method for setting a setting condition for a shooting apparatus, which comprises a touch panel on a display, comprising:

perform a position detection to detect a two dimensional touch start point on the touch panel;

perform a detection direction control to specify a first direction according to the two dimensional touch start point detected in the position detection and a second direction according to the two dimensional touch start point detected in the position detection;

detecting (i) a dragging manipulation status from the two dimensional touch start point on the touch panel to an end of the touch in the first direction and (ii) an amount of dragging in the second direction consecutive to the dragging manipulation status in the first direction, which is different from the first direction, as the dragging manipulation status;

updating a first shooting condition based on the dragging manipulation status in the first direction which is being detected in the detecting the dragging manipulation status;

updating a second shooting condition which k different from the first shooting condition according to the amount of dragging in the second direction detected in the detecting the dragging manipulation status; and setting the updated first shooting condition and the updated the second shooting condition as a shooting condition for performing a shooting.

* * * * *